United States Patent
Sugaya

(10) Patent No.: US 8,952,779 B2
(45) Date of Patent: Feb. 10, 2015

(54) PORTABLE TERMINAL, METHOD, AND PROGRAM OF CHANGING USER INTERFACE

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 316 days.

(21) Appl. No.: 13/113,578

(22) Filed: May 23, 2011

(65) Prior Publication Data

US 2012/0154108 A1    Jun. 21, 2012

(30) Foreign Application Priority Data

Dec. 16, 2010 (JP) .................. 2010-280674

(51) Int. Cl.
- *G05B 19/00* (2006.01)
- *G06F 9/44* (2006.01)
- *H04N 21/41* (2011.01)
- *G08C 17/02* (2006.01)
- *H04M 1/725* (2006.01)
- *H04N 21/414* (2011.01)

(52) U.S. Cl.
CPC .......... *G06F 9/4443* (2013.01); *H04N 21/4126* (2013.01); *H04N 21/4131* (2013.01); *G08C 17/02* (2013.01); *H04M 1/72533* (2013.01); *H04N 21/41407* (2013.01); *G08C 2201/34* (2013.01); *G08C 2201/93* (2013.01); *G08C 2201/91* (2013.01)
USPC ........................................................ 340/5.1

(58) Field of Classification Search
USPC .......... 307/11, 38, 40; 707/723; 710/5, 15, 72
See application file for complete search history.

(56) References Cited

U.S. PATENT DOCUMENTS

| | | | |
|---|---|---|---|
| 2005/0225453 A1* | 10/2005 | Chang et al. | 340/825.69 |
| 2006/0020884 A1* | 1/2006 | Graham | 715/517 |
| 2008/0303961 A1* | 12/2008 | Shioji | 348/734 |
| 2011/0095978 A1* | 4/2011 | Pehlivan et al. | 345/158 |
| 2011/0212702 A1* | 9/2011 | Howard et al. | 455/404.2 |
| 2011/0298581 A1* | 12/2011 | Hsu | 340/4.3 |
| 2012/0068857 A1* | 3/2012 | Rothkopf et al. | 340/870.07 |
| 2012/0146918 A1* | 6/2012 | Kreiner et al. | 345/173 |

FOREIGN PATENT DOCUMENTS

| | | | |
|---|---|---|---|
| JP | 2001231083 A | 8/2001 | |
| KR | 20070060957 A | 6/2007 | |
| KR | 1020070060957 A | 6/2007 | |

* cited by examiner

Primary Examiner — Brian Zimmerman
Assistant Examiner — Thomas McCormack
(74) Attorney, Agent, or Firm — BainwoodHuang

(57) ABSTRACT

A user can automatically change a user interface of a portable terminal into a user interface of an electronic appliance suitable for user's intention. A portable terminal recognizes a circumferentially existing electronic appliance based on a photographic image or a radio signal, and allows one or more applications having a user interface varying by electronic appliance to start and then be resident in a memory of the portable terminal. Then, when the portable terminal recognizes a predetermined electronic appliance, the portable terminal changes a user interface displayed on a display unit and an input unit of the portable terminal into a user interface of an application associated with the predetermined electronic appliance to enable a user to view the user interface. When a user puts the portable terminal to a predetermined direction, the portable terminal recognizes an electronic appliance existing in the direction and displays the corresponding user interface.

18 Claims, 11 Drawing Sheets

UI LOCATION CORRESPONDENCE TABLE

| THE MODEL NAME OF ELECTRICAL APPLIANCE | LOCATION INFORMATION | USER INTERFACE |
|---|---|---|
| TV-100 | $(X1,Y1,Z1) \sim (X2,Y2,Z2)$ | TV-100 UI |
| RZ-001 | $(X3,Y3,Z3) \sim (X4,Y4,Z4)$ | RZ-100 UI |

Fig. 10

UI LOCATION CORRESPONDENCE TABLE 1

| THE MODEL NAME OF ELECTRICAL APPLIANCE | RECEIVED RADIO WAVE | USER INTERFACE |
|---|---|---|
| TV-100 | Bluetooth PIN 555 | TV-100 UI |
| RZ-001 | Bluetooth PIN 305 | RZ-001 UI |

Fig. 11

UI LOCATION CORRESPONDENCE TABLE 2

| THE MODEL NAME OF ELECTRICAL APPLIANCE | IMAGE | USER INTERFACE |
|---|---|---|
| TV-100 | 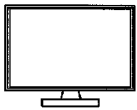 | TV-100 UI |
| RZ-001 | 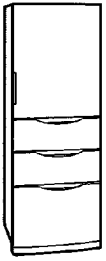 | RZ-001 UI |

Fig. 12

UI LOCATION CORRESPONDENCE TABLE 3

| THE MODEL NAME OF ELECTRICAL APPLIANCE | RECOGNIZED CHARACTERS | USER INTERFACE |
|---|---|---|
| TV-100 | TV-100 | TV-100 UI |
| RZ-001 | RZ-001 | RZ-001 UI |

Fig. 13

UI LOCATION CORRESPONDENCE TABLE 4

| THE MODEL NAME OF ELECTRICAL APPLIANCE | SSID | RECEIVED RADIO WAVE | USER INTERFACE |
|---|---|---|---|
| TV-100 | 213411 | Bluetooth PIN 555 | TV-100 UI |
| RZ-001 | 213411 | Bluetooth PIN 305 | RZ-001 UI |

Fig. 16

UI LOCATION CORRESPONDENCE TABLE 5

| THE MODEL NAME OF ELECTRICAL APPLIANCE | LONGITUDE, LATITUDE | USER INTERFACE |
|---|---|---|
| TV— 100 | X1, Y1 | TV-100 UI |
| RZ— 001 | X2, Y2 | RZ-001 UI |

Fig. 17

UI LOCATION CORRESPONDENCE TABLE 6

| THE MODEL NAME OF ELECTRICAL APPLIANCE | SSID | USER INTERFACE |
|---|---|---|
| TV— 100 | 213411 | TV-100 UI |
| RZ— 001 | 213411 | RZ-001 UI |

Fig. 18

UI LOCATION CORRESPONDENCE TABLE 7

| THE MODEL NAME OF ELECTRICAL APPLIANCE | DAY OF THE WEEK | TIME | USER INTERFACE |
|---|---|---|---|
| TV— 100 | MON-FRI | 9:00 A.M. | TV-100 UI |
| RZ— 001 | SAT | 7:00 P.M. | RZ-001 UI |

UI LOCATION CORRESPONDENCE TABLE 8

| PRIORITY ORDER | THE MODEL NAME OF ELECTRICAL APPLIANCE | USER INTERFACE |
|---|---|---|
| 2 | TV-100 | TV-100 UI |
| 1 | RZ-001 | RZ-001 UI |
| 3 | MP500 | MP500 UI |

PORTABLE TERMINAL, METHOD, AND PROGRAM OF CHANGING USER INTERFACE

This application is based on and claims the benefit of priority from Japanese Patent Application No. 2010-280674, filed on 16 Dec. 2010, the content of which is incorporated herein by reference.

TECHNICAL FIELD

The present invention relates to a portable terminal, a method, and a program of changing a user interface. In particular, the present invention relates to technology in which a portable terminal recognizes existence of an electronic appliance to change the user interface of the portable terminal into the user interface used by the electronic appliance.

BACKGROUND ART

In related art, it is known that the location information of a portable terminal is used to control electronic appliances in a house. For example, it is known that an air conditioner and a personal computer in a house and an office, are turned on when the portable terminal approaches the house and the office using GPS (Global Positioning System) installed in a portable terminal (See Patent document 1).

However, it is a distant idea that all preliminarily associated electronic appliances in a house are turned on just because a portable terminal approaches the house. For example, if the electronic appliance is a television, it is preferable that control, such as to change the user interface of the portable terminal to a television remote control, is conducted when a user is in front of the television. However, for example, the user interface of the portable terminal is changed into a television remote control not when a user is in front of the television but when a user is on the way house, which is far from detailed control.

The pinpoint control of the user interface of a portable terminal for achieving such a function may be limited due to the accuracy of GPS. Changing the user interface depending on only location information raises another problem in which an optimal user interface is not obtained, for example, when the location of an electronic appliance is changed.

CITATION LIST PATENT LITERATURE

Patent document 1: Japanese Unexamined Patent Application 2001-231083

SUMMARY OF INVENTION

An object of the present invention is to provide a portable terminal, a method, and a program capable of automatically changing a user interface of a portable terminal into the user interface of an electronic appliance suitable for user's intention in an elaborate manner even if a user does not intentionally change the user interface.

An object of the present invention is to provide a portable terminal, a method, and a program capable of controlling an electronic appliance depending on time and season when a user, who owns a portable terminal, approaches the user's house.

An object of the present invention is to provide a portable terminal, a method, and a program capable of pinpoint control of an electronic appliance so as to react to the location of the portable terminal appropriately.

According to a first aspect of the present invention, the portable terminal includes:

a recognizer recognizing a circumferentially existing electronic appliance based on a photographic image or a radio signal;

an application controller allowing one or more applications related to the electronic appliance to start and then be resident in a memory, the application having a user interface varying by electronic appliance; and an interface changer, when the recognizer recognizes a predetermined electronic appliance, changing a user interface displayed on a display unit and an input unit of the portable terminal into a user interface of an application associated with the recognized predetermined electronic appliance, among the applications being resident in the memory, so as to enable a user to view the user interface using the portable terminal.

According to the first aspect of the present invention, a portable terminal recognizes a circumferentially existing electronic appliance based on a photographic image or a radio signal, allows one or more applications related to the electronic appliance to start and then be resident in a memory. The application has a user interface varying by electronic appliance. Then, when the portable terminal recognizes a predetermined electronic appliance, the portable terminal changes a user interface displayed on a display unit and an input unit of the portable terminal into a user interface of an application associated with the predetermined electronic appliance, among the applications being resident in the memory, so as to enable a user to view the user interface using the portable terminal.

Therefore, the portable terminal can change a display and input acceptance into the user interface of an electronic appliance for user's intention even if a user does not intentionally display a user interface associated with an electronic appliance by key operation or the like.

In categories of the invention, a method and a program have functions and effects similar to those of the portable terminal according to the first aspect of the present invention.

According to a second aspect of the present invention, in the portable terminal according to the first aspect of the present invention, the recognizer recognizes the electronic appliance by receiving at least one of a GPS radio signal, an SSID radio signal, and a short distance radio signal.

According to the second aspect of the present invention, the portable terminal recognizes the electronic appliance by receiving at least one of a GPS radio signal, an SSID radio signal, and a short distance radio signal.

Therefore, based on user's location information, an access point or SSID, the portable terminal can change a display and input acceptance into the user interface of an electronic appliance for user's intention even if a user does not intentionally display a user interface associated with an electronic appliance by key operation or the like.

According to a third aspect of the present invention, the portable terminal according to the first aspect of the present invention further includes:

a memory storing the physical location of the electronic appliance as location information;

a first detector detecting the direction to which the upper face of the portable terminal points;

a positioning determinator determining the physical location of the portable terminal, and an object determinator determining an electronic appliance existing in a path being an extension of the direction of the upper face of the portable terminal, among electronic appliances, the location information of which is stored, wherein the interface changer changes the user interface of the portable terminal into a user interface of an application associated with an electronic appliance determined by the object determinator.

According to the third aspect of the present invention, the physical location of the electronic appliance is stored as location information, the direction to which the upper face of the portable terminal points is recognized, and the physical location of the portable terminal is determined. Then, electronic appliance existing in a path being an extension of the direction of the upper face of the portable terminal, among electronic appliances, the location information of which is stored, is determined, and the user interface of the portable terminal into a user interface the an application associated with the determined electronic appliance.

Therefore, the user interface of a portable terminal can be changed into the user interface of an electronic appliance existing in a direction to which the portable terminal is pointed by a user. For example, even if a plurality of electronic appliances exist, the user interface of a portable terminal can be changed into the user interface of one electronic appliance in a path being an extension of the direction of the upper face of the portable terminal.

According to a fourth aspect of the present invention, in the portable terminal according to the third aspect of the present invention, the first detector detects the direction to which the upper face of the portable terminal points from the difference in location information contents, each of which is detected by two or more location detectors respectively.

According to the fourth aspect of the present invention, the portable terminal detects the direction to which the upper face of the portable terminal points is detected from the difference in location information contents, each of which is detected by two or more location detectors respectively.

Therefore, with only a location detector (such as a GPS device), for example, without an electronic compass or an inclination sensor the direction to which the upper face of the portable terminal points can be detected.

According to a fifth aspect of the present invention, in the portable terminal according to the third aspect of the present invention, the first detector detects the direction to which the upper face of the portable terminal points by at least one of an electronic compass and an inclination sensor.

According to the fifth aspect of the present invention, the portable terminal detects the direction to which the upper face of the portable terminal points by at least one of an electronic compass and an inclination sensor.

According to a sixth aspect of the present invention, the portable terminal according to the first aspect of the present invention further includes a second detector detecting SSID or an access point by receiving a radio signal, wherein only when the second detector detects a predetermined SSID, the recognizer performs a process recognizing an electronic appliance based on a short distance radio signal output from the predetermined electronic appliance.

According to the sixth aspect of the present invention, the portable terminal according to the first aspect of the present invention detects an SSID by receiving a radio signal, and only when detects a predetermined SSID is detected, the portable terminal recognizes an electronic appliance based on a short distance radio signal output from the predetermined electronic appliance.

Therefore, when the portable terminal detects a predetermined SSID, in other words, only when the portable terminal is within the area in which the portable terminal can receive a radio signal of SSID associated with the portable terminal, the portable terminal can change its user interface. For example, only when the portable terminal is located in a house and a workplace, the portable terminal can change its user interface into the user interface of the electronic appliance.

According to the seventh aspect of the present invention, in the portable terminal according to the first aspect of the present invention, the recognizer recognizes the electronic appliance based on a photographic image obtained by taking an image of an electronic appliance with a camera provided on the upper face of the portable terminal Therefore, when a user holds this portable terminal, the upper face of a housing on which a camera is located becomes the face for taking an image of an electronic appliance 100 easily because the upper face is spontaneously pointed to the front of the user.

According to an eighth aspect of the present invention, the portable terminal according to the seventh aspect of the present invention, the recognizer recognizes a photographic image obtained by taking an image of a marker attached to the electronic appliance when the recognizer recognizes the electronic appliance with a camera of the portable terminal.

Therefore, the electronic appliance is recognized by not taking an image of the electronic appliance itself but of a marker, so that the recognition rate can be increased. In other words, even if an image of the electronic appliance itself is taken, a photographed part of the entire electronic appliance and the contrasting and the coloring of the electronic appliance may increase the possibility of the lower recognition rate. However, a marker such as a two dimensional code as a subject photographed may increase the recognition rate.

According to a ninth aspect of the present invention, in the portable terminal according to the first aspect of the present invention, the recognizer transmits an SSID detected by the second detector to a communicatably connected server and receives data associated with the SSID and used for recognizing an electronic appliance based on a photographic image or a radio signal so as to perform recognition of the electronic appliance.

Therefore, based on data that the portable terminal receives from a server, the portable terminal recognizes circumferentially existing electronic appliance based on a photographic image or a radio signal. At this point, since the portable terminal transmits an SSID to a server and receives data associated with the SSID, it is not necessary to store data for recognizing many electronic appliances to be possibly recognized, in the portable terminal. However it is necessary to recognize only electronic appliance limited to an SSID. This can improve the recognition rate and shorten the recognition time.

According to a tenth aspect of the present invention, in the portable terminal according to the first aspect of the present invention, when the recognizer recognizes two or more electronic appliances, the interface changer changes the user interface of the portable terminal into the user interface of an application associated with one of the predetermined electronic appliances based on a date of recognition.

Therefore, even if a user does not intentionally display a user interface associated with the electronic appliance by key operation or the like, the portable terminal can change the display and input acceptance into the user interface of the electronic equipment for user's intention based on a date of recognition.

According to an eleventh aspect of the present invention, in the portable terminal according to the first aspect of the present invention, when the recognizer recognizes two or more electronic appliances, the interface changer changes the user interface of the portable terminal into the user interface of an application associated with one of the predetermined electronic appliances based on a predetermined priority order.

Therefore, even if two or more electronic appliances are recognized, the user interface of the portable terminal can be changed based on a predetermined priority order (e.g. the descending order of past operation and the ascending order of the distance between the portable terminal and each electronic appliance).

According to the present invention, a user can change the user interface of a portable terminal into the user interface of an electronic appliance suitable for user's intention even if a user does not intentionally change the user interface of the portable terminal.

BRIEF DESCRIPTION OF DRAWINGS

FIG. 10 illustrates a UI correspondence table 1 stored in the portable terminal 10;

FIG. 11 illustrates a UI correspondence table 2 stored in the portable terminal 10;

FIG. 12 illustrates a UI correspondence table 3 stored in the portable terminal 10;

FIG. 13 illustrates a UI correspondence table 4 stored in the portable terminal 10;

FIG. 16 illustrates a UI correspondence table 5 stored in the portable terminal 10;

FIG. 17 illustrates a UI correspondence table 6 stored in the portable terminal 10;

FIG. 18 illustrates a UI correspondence table 7 stored in the portable terminal 10;

DESCRIPTION OF EMBODIMENTS

Hereinafter, a best mode of the present invention will be described with reference to attached drawings. However, this is illustrative only, and the scope of the present invention is not limited thereto.

UI Change System

Figure 1:
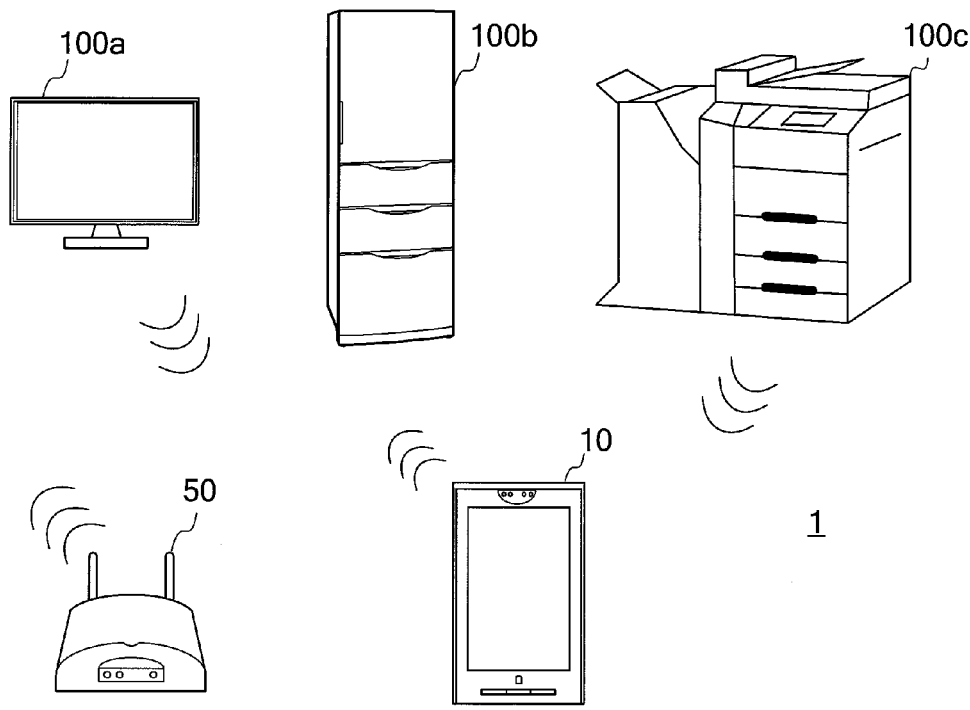
FIG. 1 is an overall view of a UI change system 1 according to a preferred embodiment of the present invention.

FIG. 1 is an overall view of a UI change system 1 according to a preferred embodiment. The UI change system 1 includes a portable terminal 10, electronic appliances 100a-100c (hereinafter simply put "an electronic appliance 100" in the place of "user terminals 100a-100c"), and a radio 50 sending a radio signal.

As shown by the portable terminal 10 of FIG. 1, for example, when a user brings a portable terminal 10 around the electronic appliance 100b, the user interface displayed on a display unit of the portable terminal 10 is changed into the user interface of an electronic appliance 100b.

The electronic appliance 100 may be an information appliance such as a mobile phone, a handheld terminal, a computer (personal computer), a television 100a, a telephone, a smart phone, a net book terminal, a slate terminal, an electronic book terminal, a portable music player, an audio component, a content player, a printer, a FAX machine, a copy machine, a scanner machine, or an MFP (a multi-function peripheral device or a multi-function printer) 100c, or a home appliance such as a refrigerator 100b, a washing machine, a microwave oven, a security door, or a rice cooker. The electronic appliance 100 may be a NFC (Near Field Communication) tag.

The electronic appliance 100 can preferably send (output) and receive (input) a radio signal complying with a short distance radiocommunication standard such as Bluetooth®. In this example, the television 100a and the MFP100c have a device capable of sending and receiving a Bluetooth® radio signal, but the refrigerator 100b do not.

A radio 50 has a function that receives a radio signal of a wireless LAN (Local Area Network) complying with IEEE 802.11 and the like from the electronic appliance 100 and the portable terminal 10 to enable these terminals to communicate with each other and with a public line or the Internet. Each radio 50 has a unique SSID (Service Set Identifier). The SSID is an identifier of a wireless LAN access point.

For example, the portable terminal 10 may be an information appliance such as a mobile phone, a handheld terminal, a computer (personal computer), a television, a cordless handset, a smart phone, a net book terminal, a slate terminal, an electronic book terminal, a portable music player, a remote control, or an electronic book.

Figures 2, 4:
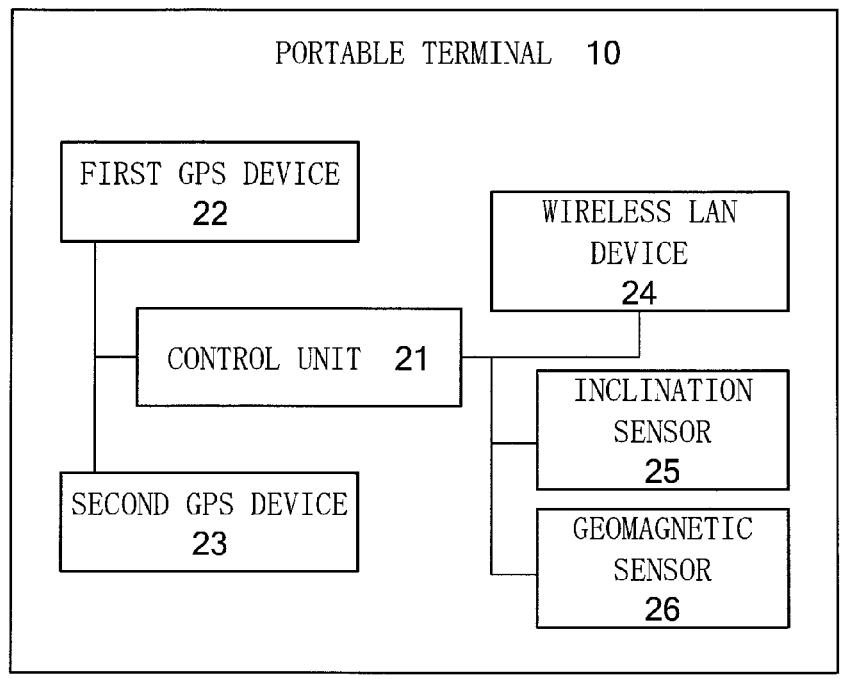
FIG. 2 is a functional block diagram of a portable terminal 10 of a first basic process.
FIG. 4 illustrates a UI location correspondence table stored in the portable terminal 10.

As shown in FIG. 2, the portable terminal 10 includes a central processing unit such as CPU (Central Processing Unit) and memories such as a RAM (Random Access Memory) and a ROM (Read Only Memory). As a communication unit, the portable terminal 10 further includes a wireless LAN device 24 complying with IEEE 802.11, and this device is a part of the wired and wireless associated device.

The portable terminal 10 may include a GPS device that receives a GPS (Global Positioning System) signal and determines the physical location of the portable terminal 10. As described hereinafter, in order to detect the direction of the portable terminal 10, a plurality of devices (in FIG. 2, a first GPS device 22 and a second GPS device 23) may be located away from the surface of the portable terminal 10.

The portable terminal 10 may also include an inclination sensor 25 that detects the tilt level of the portable terminal 10. The portable terminal 10 may also include a geomagnetic sensor 26 to achieve the electronic compass function. The GPS device, the inclination sensor 25, and the geomagnetic sensor 26 may operate independently but may be used in cooperation to improve the accuracy of direction detection.

The portable terminal 10 may include a wireless device complying with Bluetooth® as a communication unit. The portable terminal 10 may further include an SSD (Solid State Drive) and the like as a memory unit. The portable terminal 10 may further include a display unit such as a liquid crystal monitor that displays an image and an input unit such as a touch panel that accepts input from a user. The portable terminal 10 may include a camera that takes a picture of the electronic appliance 100, a model name, and a marker. The latter two are described hereinafter.

A control unit of the portable terminal 10 can execute a predetermined application program (hereinafter simply referred to as "application"), so that the controller can allow an application to start and then be resident in the memory of the portable terminal 10. In the following description, the application does not depend on the kind of an electronic appliance 100 but is one integrated application that changes the user interface depending on the kind of an electronic appliance 100. In other words, one application has a user interface varying by electronic appliance 100. However, the user interface may be changed by allowing a plurality of applications varying by the kind of an electronic appliance 100 to be resident and to switch to one application associated with a predetermined condition.

Figure 8:
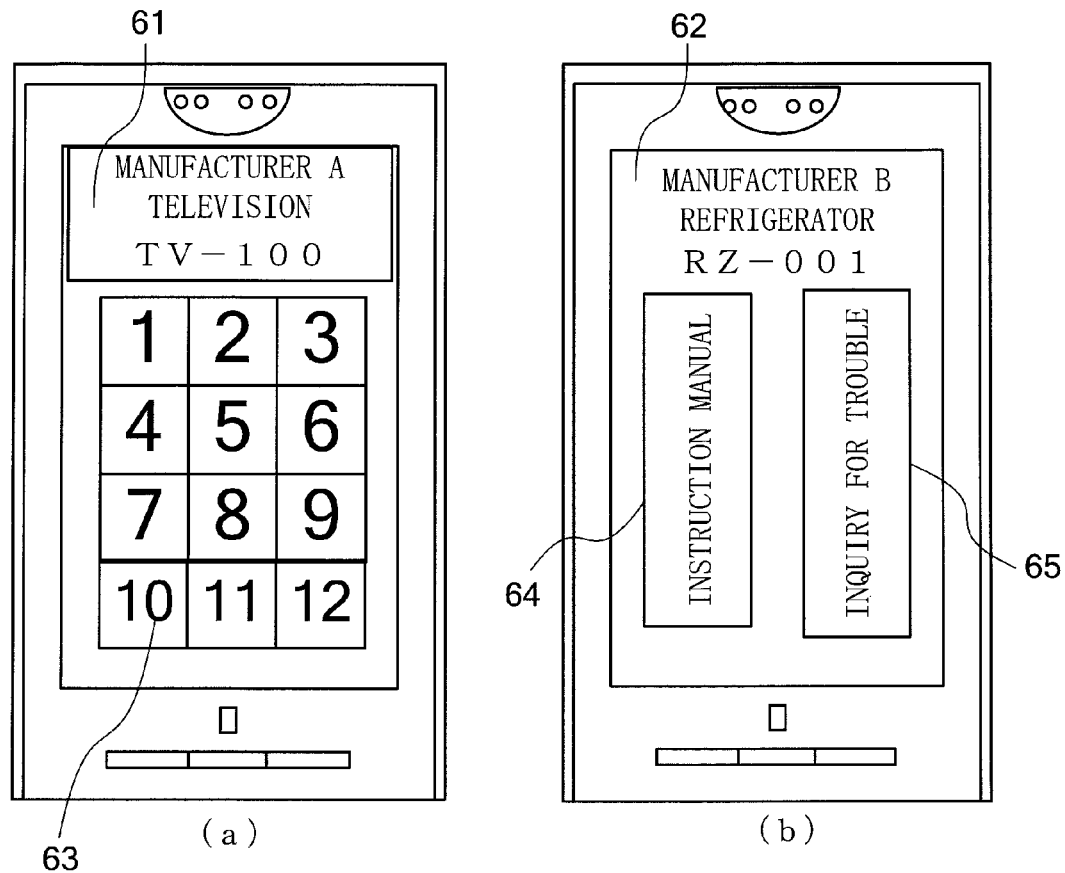
FIG. 8 illustrates examples of user interfaces displayed on the portable terminal 10.

For use of the applications, for example, as shown in FIG. 8, the application of a television 100*a* may be an application used for remote control of a television (a remote control to change channels). The application of a refrigerator 100*b* may be an application used for check of the setting of a refrigerator 100*b* or an application used for the instruction manual list, inquiry about malfunction, and remote control operation of the refrigerator.

First Basic Process

In this process, the portable terminal 10 includes a recognizer, an application controller, an interface changer, a memory, a first detector, a positioning determinator, and an object determinator. These components are achieved by cooperation of hardware of a controller unit, a communication unit, a memory unit, a display unit, and an input unit. Hereinafter the function of each component is described with reference to the accompanied flow chart.

Figure 3:
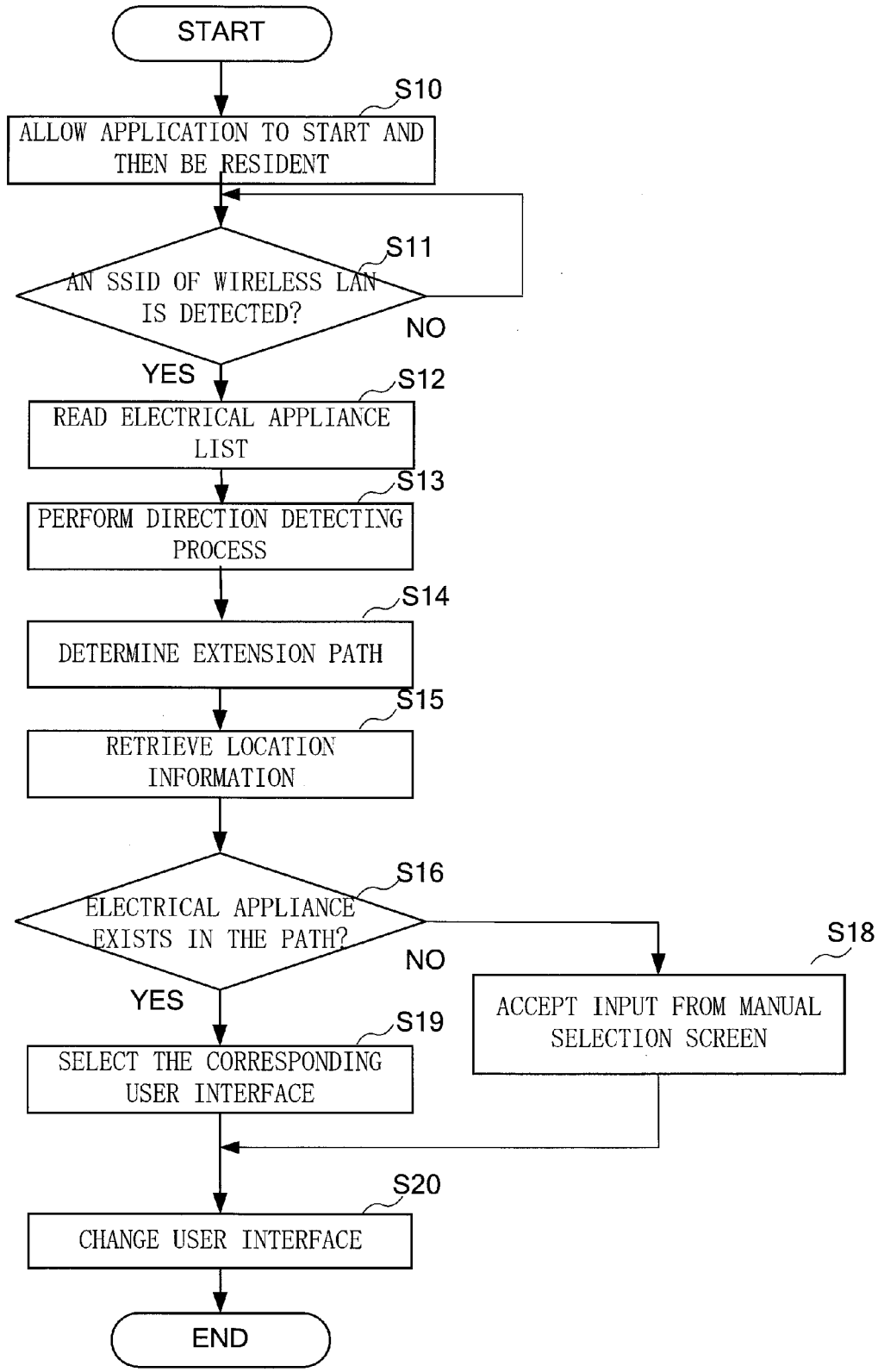
FIG. 3 illustrates the first basic process flow performed by the portable terminal 10.

FIG. 3 is the flow chart of the first basic process performed by the portable terminal 10. First, the application controller 12 of the portable terminal 10 allows an application to start and then be resident in the memory of the portable terminal 10 (Step S10).

The recognizer of the portable terminal 10 determines if an SSID of a wireless LAN has been detected (Step S11). For example, the portable terminal 10 receives a radio signal of a wireless LAN from a radio 50 located in a house and an office to determine if an SSID have been detected.

If an SSID of a wireless LAN is detected (Step S11: "YES"), the recognizer reads an electronic appliance list table associated with the received SSID (Step S12). The electronic appliance list table is a table in which an SSID is associated with one or more electronic appliances 100 connectable with the LAN having this SSID. This table may be stored in the memory of the portable terminal 10 or may be received on request from a server communicatable with the portable terminal 10. Alternatively, the portable terminal 10 may receive and read only resulting data of an electronic appliance list. If an SSID of a wireless LAN is not detected (Step S11: "NO"), the process is returned.

Figure 5:
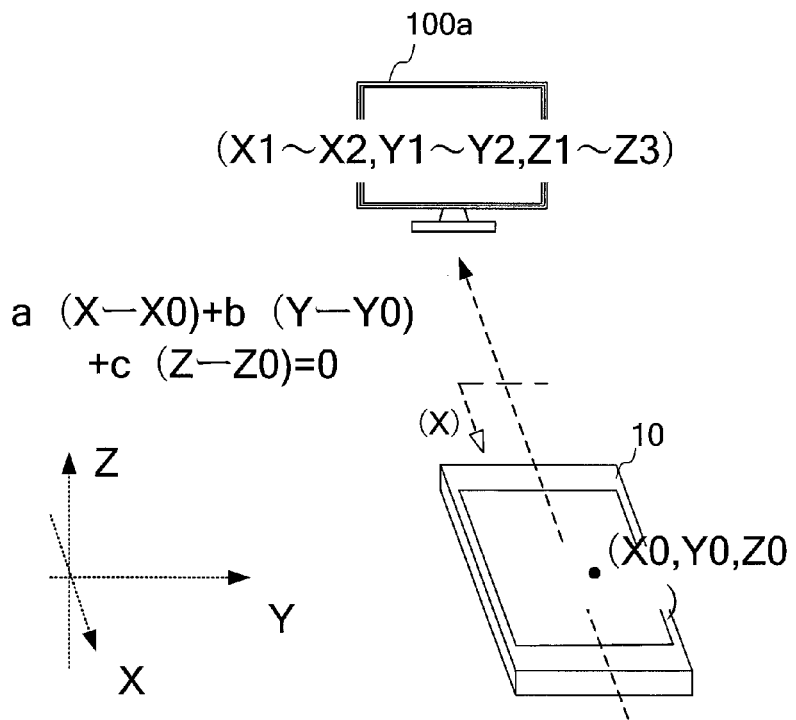
FIG. 5 is a schematic diagram illustrating a direction to which the upper face of the portable terminal 10 points.

Then, the first detector of the portable terminal 10 performs a process that detects the direction (a, b, c) to which the upper face of the portable terminal 10 points (Step S13). The upper face of the portable terminal 10 is the face indicated by (X) of FIG. 9. The faces of a hexahedron of the housing of the portable terminal 10 or a solid equivalent thereto are an upper face, a lower face, a front face, a rear face, a right face, and a left face. The front face has a display unit and an input unit of the portable terminal. The upper face is the face upward in the vertical direction of characters displayed on the display unit when a user normally read the characters As shown in FIG. 5, the geomagnetic sensor 26, the inclination sensor 25, and the like, which function as an electronic compass, detects the direction (minus direction of X) to which the upper face of the portable terminal 10 points. The direction may be detected based on the difference between the respective location information contents of the first GPS device 22 and the second GPS device 23. For example, when the first GPS device 22 is located in the upper portion of the portable terminal 10, and the second GPS device 23 is located in the lower portion of the portable terminal 10 (both GPS devices are away from each other), and when both GPS devices are located in the same plane, the direction to which the upper face of the portable terminal 10 points can be detected based on a direction vector connecting position coordinates (longitude, latitude, height) respectively detected by the GPS devices are connected.

Then, the object determinator determines the extension path that is determined from a direction detected by the first detector (Step S14). First, the positioning determinator determines the physical location of the portable terminal 10 by the first GPS device 22 or second GPS device 23 (or both). In the example of FIG. 5, the physical location is (X0, Y0, Z0). This physical location is parallel to the direction vector (a, b, c) that the first detector has determined. The physical location may be a point in a line parallel to the direction vector (a, b, c) detected by the first detector, and the line passes through the point at which the bisectors of the respective lines (in the X and Y direction) perpendicular to the direction vector (a, b, c) of the upper face of the portable terminal 10 are intersected. Alternatively, the physical location may be the centroid of the portable terminal 10.

Then, the object determinator determines the extension path by generating the three dimensional-line equation: $a(X-X0)+b(Y-Y0)+c(Z-Z0)=0$, which passes through (X0, Y0, Z0) and has a direction (the slope is (a, b, c)) that the first detector has determined.

Then, the object determinator retrieves the location information of an electronic appliance 100 in the electronic appliance list table that has previously been read out (Step S15). For example, as shown in FIG. 4, the UI location correspondence table is stored in the portable terminal 10. The object determinator retrieves the location information corresponding to the model name of an electronic appliance. The location information of the electronic appliance 100 is not a point of one place but an extensive plane (area), like (X1-X2, Y1-Y2, Z1-Z3) to fit on the size of an electronic appliance 100.

When the location information is retrieved, the object determinator determines if an electronic appliance 100 exists in the path being an extension of the direction of the upper face of the portable terminal 10 (Step S16). In other words, the object determinator determines if an electronic appliance 100 exists by determining whether or not the generated three dimensional-line equation and the location area (X1-X2, Y1-Y2, Z1-Z3) of the electronic appliance are intersected.

If the object determinator determines that an electronic appliance 100 exists in the path being an extension of the direction of the upper face of the portable terminal 10 (Step S16: "YES"), the object determinator determines the electronic appliance 100 to be an object. Then, the interface changer 13 of the portable terminal 10 selects a corresponding user interface from the name of the user interface of the recognized electronic appliance 100 (Step S19). For example, if the object determinator determines that the generated three dimensional-line equation and the location area (X1-X2, Y1-Y2, Z1-Z3) are intersected, the object determinator determines that the electronic appliance, the model name of which is "TV-100", exists. Then, the interface changer selects the user interface name "TV-100 UI".

If the object determinator determines that the electronic appliance 100 does not exist in the path being an extension of the direction of the upper face of the portable terminal 10 (Step S16: "NO"), it is considered that a user puts the portable terminal 10 to an irrelevant direction. In this case, the screen (for example, FIG. 21) for allowing a user to select the user interface of an electronic appliance 100 from the electronic appliance list table that is previously read out is displayed, the user interface of the electronic appliance 100 is accepted from a user manually (Step S18). The portable terminal 10 selects the user interface by input from a user.

In any of these cases, when the portable terminal 10 selects a user interface (Step S16), the interface changer changes the user interface of the portable terminal so that a user can preferentially view the selected user interface (Step S20). For example, respective applications for TV-100, RZ-001, and mail are resident in the memory of the portable terminal 10. In this case, when "TV-100 UI" is selected as a user interface name, the user interface of the application for TV-100 is displayed so that a user can easily view the user interface.

In the first basic process, the process in the step S11 is a process in which the portable terminal 10 detects an SSID but may be a process of detecting that the portable terminal 10 is located in a predetermined area by GPS function. In this case, a predetermined area (such as a house and a work place) specified by a user and electronic appliances 100 that should be recognized in this area are associated as an electronic appliance list correspondence table. When the portable terminal 10 is located in a predetermined area, one or more electronic appliances 100 that should be recognized in this area are retrieved from the electronic appliance list correspondence table.

Second Basic Process

Figure 6:
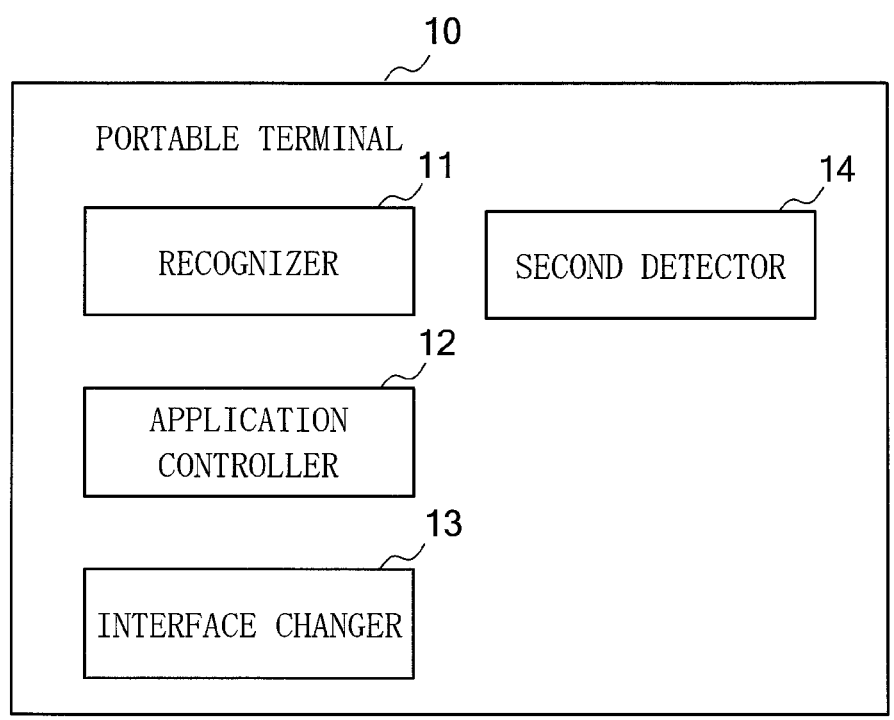
FIG. 6 is a functional block diagram of a portable terminal 10 of a second basic process.

In this process, as shown in FIG. 6, the portable terminal 10 includes a recognizer 11, an application controller 12, an interface changer 13, and a second detector 14. These components are achieved by cooperation of hardware of a controller unit, a communication unit, a memory unit, a display unit, and an input unit. Hereinafter the function of each component is described with reference to the accompanied flow chart.

Figure 7:
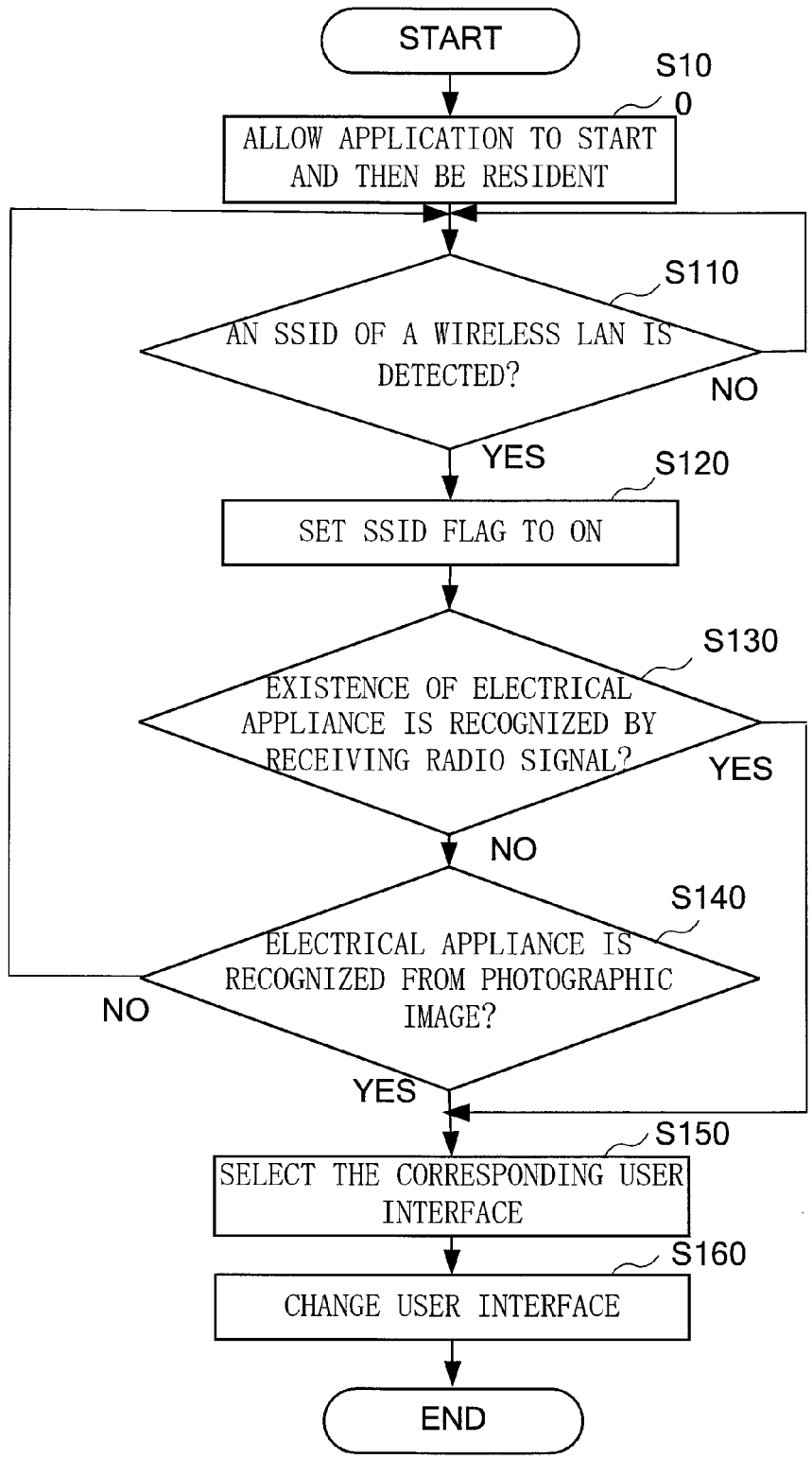
FIG. 7 illustrates the second basic process flow performed by the portable terminal 10.

FIG. 7 is the flow chart of the second basic process performed by the portable terminal 10. First, the application controller 12 of the portable terminal 10 allows an application to start and then be resident in a memory of the portable terminal 10 (Step S100).

Then, the second detector 14 of the portable terminal 10 determines if an SSID of a wireless LAN have been detected (Step S110). For example, the portable terminal 10 receives a radio signal of a wireless LAN from a radio 50 located in a house and an office to determine if an SSID has been detected. When an SSID of this radio 50 is detected, the portable terminal 10 can recognize that the portable terminal 10 itself is in a house and in an office even without GPS function.

If the second detector 14 of the portable terminal 10 detects an SSID of a wireless LAN (Step S110: "YES"), the SSID flag is set to ON (Step S120), and then the portable terminal 10 enables wireless communication. If the second detector 14 of the portable terminal 10 does not detect an SSID of a wireless LAN (Step S110: "NO"), the step S110 is repeated.

This process is provided for the following reason. For example, it is often undesirable that the user interface of an electronic appliance 100 in a place other than user's house or office is displayed on the user's portable terminal 10. This is because the user interface for changing the setting of the electronic appliance 100 can be operated by an irrelevant person. Therefore, the process of the step S110 is provided for use of an SSID as security authentication.

Then, the recognizer 11 determines whether or not the recognizer 11 has recognized existence of an electronic appliance 100 by receiving a radio signal of short distance communication such as Bluetooth® (Step S130). For example, this step is processed when a user brings the portable terminal 10 around the television 100*a* and the MFP100*c*. The electronic appliance 100 of the television 100*a* and the MFP100*c* output a radio signal of short distance communication. When the portable terminal 10 is located within this radio wave propagation range, the recognizer 11 of the portable terminal 10 receives a radio signal and then transmits a radio signal corresponding to the received short distance. Then, the portable terminal 10 recognizes the electronic appliance 100 by starting communication between the portable terminal 10 and the electronic appliance 100 by using a predetermined protocol.

For example, as shown in FIG. 10, the kind of a radio wave received through short distance communication corresponds to the model name and the user interface name of an electronic appliance as the UI correspondence table 1. This UI correspondence table 1 is stored in the portable terminal 10. In this case, when the appliance identity "PIN number 555" is received as a received radio wave from an electronic appliance 100, the model name of the electronic appliance 100 is recognized as "TV-100".

If the recognizer 11 recognizes an electronic appliance 100 (Step S130: "YES"), the process proceeds to the step S150. If the recognizer 11 does not recognize the electronic appliance 100 (Step S130: "NO"), the process proceeds to the step S140.

Then, the recognizer 11 starts a camera of the portable terminal 10 and then determines whether or not an electronic appliance 100 is recognized based on a photographed image (photographic image) (Step S140).

For example, as shown in FIG. 11, the kind of a photographic image corresponds to the model name and the user interface name of an electronic appliance as the UI correspondence table 2. This UI correspondence table 2 is stored in the portable terminal 10. In this case, in which the picture same as or similar picture to a photographic image is taken with a camera of the portable terminal 10, the recognizer determines whether or not the same electronic appliance 100 as a photographic image is taken, using a well-known image identification algorithm. If the same electronic appliance 100 as a photographic image is taken, the model name of an electronic appliance 100 is recognized as "TV-100" or the like by comparing the photographic image with the UI correspondence table 2 of FIG. 11.

Figure 14:
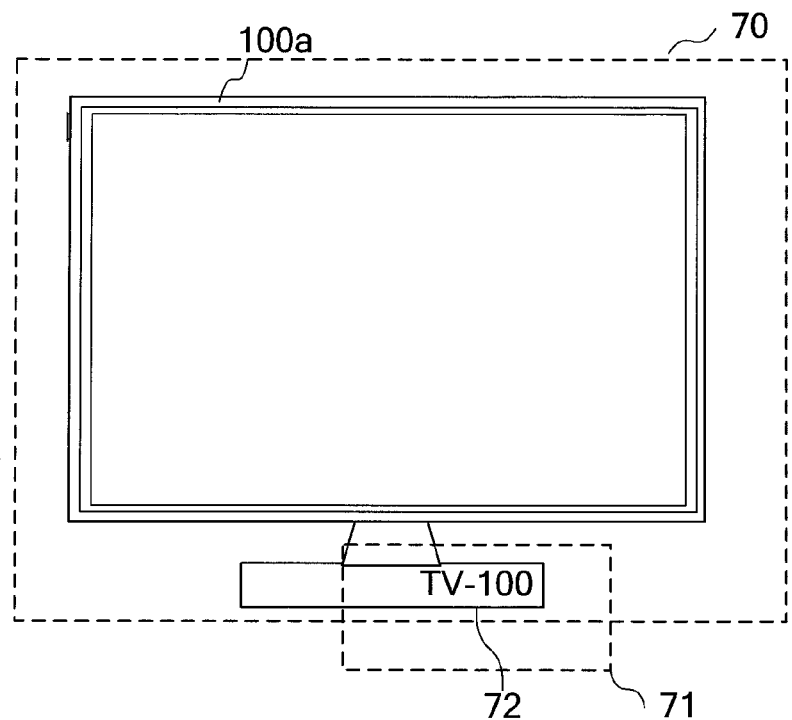
FIG. 14 illustrates a region in which an image is taken for recognizing an electronic appliance 100a based on an image.

As shown in FIG. 14, as the imaging range of the television 100*a*, like the imaging range 70, a picture of the entire television 100*a* may be taken to recognize the television 100*a*, or "TV-100" 72 that is apart of the model name may be the imaging range 71 to recognize the television 100*a*.

In this case, as shown in FIG. 12, the kind of characters recognized by imaging (recognized characters), the model name of an electronic appliance, and the name of a user interface are associated as the UI correspondence table 3, which is stored in the portable terminal 10. Based on a photographic image taken with a camera of the portable terminal 10, characters are recognized and become the corresponding recognized characters. The recognized characters may include not only a model name but also a manufacture name.

The recognized characters may be a serial number, a MAC (Media Access Control) address, an IP address, or any characters attached to an electronic appliance 100.

Figure 15:
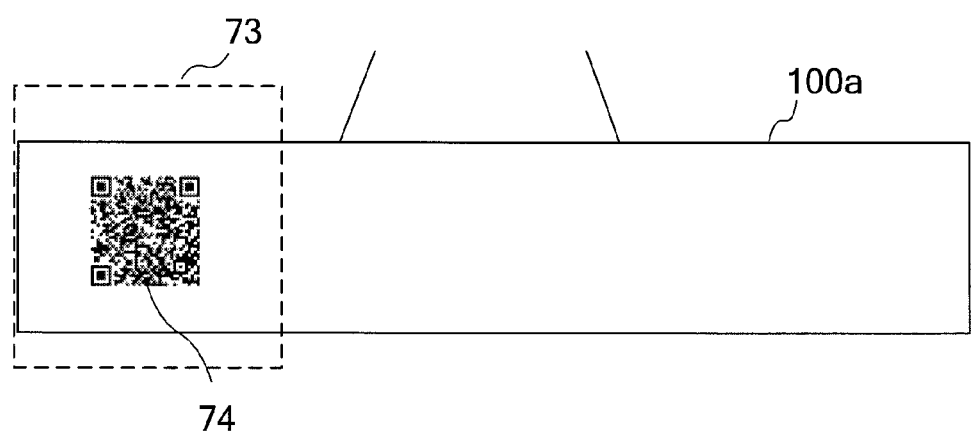
FIG. 15 illustrates a region in which a mark is taken for recognizing an electronic appliance 100a based on an image.

As shown in FIG. 15, the recognized area 73 may also be a marker 74. The marker is a figure, a sign, an image, or the like, which cannot be recognized as a character. FIG. 15 shows a QR code, and the marker may also be such a two dimensional code. In this case, likewise, the kind of a marker recognized by imaging, the model name of an electronic appliance, the name of a user interface are associated as a table, which is stored in the portable terminal 10.

If the recognizer 11 recognizes an electronic appliance 100 based on a photographic image (Step S140: "YES"), the process proceeds to the step S150. If the recognizer 11 does not recognize the electronic appliance 100 based on a photographic image (Step S140: "NO"), the process proceeds to the step S110. In this case, since no electronic appliances 100 exist around the portable terminal 10, the processes from S140 to S110 are repeated.

Next, the interface changer 13 of the portable terminal 10 selects the corresponding user interface from the name of the user interface of the recognized electronic appliance 100 (Step S150). For example, when "TV-100" is recognized as the model name of an electronic appliance, "TV-100 UI" is selected as the name of the user interface.

When the user interface is selected (Step S150), the interface changer 13 changes the user interface of the portable terminal into this selected user interface so that a user can preferentially view it (Step S160). For example, in the case in which respective applications for TV-100, RZ-001, and mail are resident in the memory of the portable terminal 10. In this case, when "TV-100 UI" is selected as the user interface name, the user interface of the application for TV-100 is displayed so that a user can easily view the user interface.

A user can preferentially view the changed user interface, which means that at this point, a user can easily view the changed user interface by viewing the display unit of the user's portable terminal 10 (for example, see FIG. 8).

Figure 9:
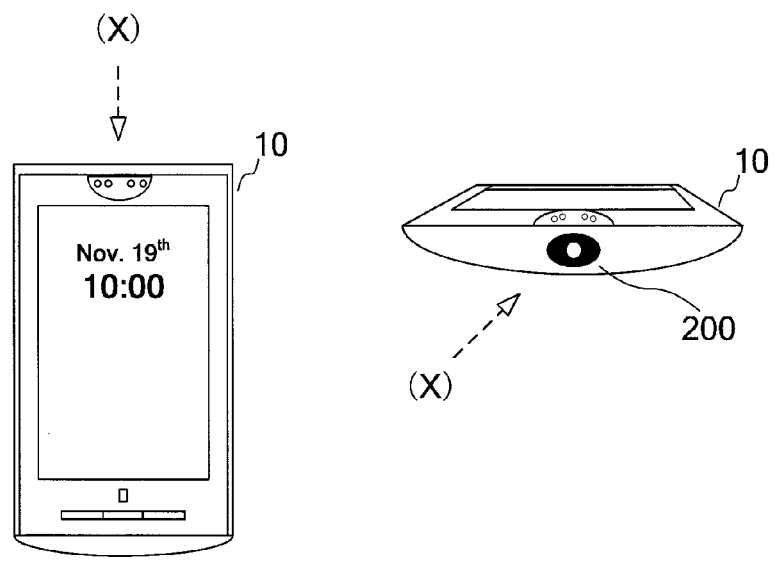
FIG. 9 illustrates a location of a camera provided in the portable terminal 10.

FIG. 9 illustrates a location of a camera of the portable terminal 10. As one example, the portable terminal 10 can be used like a remote control of an electronic appliance 100. In this case, when the portable terminal 10 is seen from the direction (X), it is clear that a camera 200 is installed in the upper face of the housing of the portable terminal 10, in which the hexahedron of the housing has an upper face, a lower face, a surface, a back face, a right side, and a left side, the surface has a display unit and an input unit of the portable terminal, and the upper face is a face upward from the upper part of characters which allow users to naturally read the characters displayed on the display unit. Therefore, when a user holds this portable terminal 10, the upper face of the housing on which the camera 200 is located is approximately perpendicular to the display unit and the input unit and becomes the face for taking an image of an electronic appliance 100 easily because the upper face is spontaneously turned to the front of the user.

ANOTHER EXAMPLE

An SSID and the model name of an electronic appliance 100 connected to a LAN having this SSID may be preliminarily associated and stored in a server. In other words, when the portable terminal 10 detects an SSID in the step S110, the portable terminal 10 inquires of this server about the kind of an electronic appliance 100 associated with this SSID. The server notifies not only the kind of an electronic appliance 100 but also data associated with a model name, a recognized object (a received short distance radio wave, a photographic image, and recognized characters, and the name of a user interface that are shown in FIGS. 10-12. This is useful because it is not necessary to store the tables as shown in FIGS. 10-12 in a portable terminal 10. An SSID qualifies the kind of an electronic appliance 100 to be recognized so that the recognition rate of an electronic appliance can be increased and the time for recognition can be shortened.

The portable terminal 10 may receive data from a server, for example, when the portable terminal starts its camera, or when the portable terminal receives a radio wave of short distance communication from an electronic appliance 100. Data is received and the camera is started at this right time, and thus it is not necessary to always recognize an electronic appliance 100, Another Embodiment Still another embodiment will be explained hereinafter. When the portable terminal 10 receives a radio signal from a GPS or with an SSID that is an access point, the portable terminal 10 changes its user interface into the user interface of an electronic appliance 100. In this case, at about the same time, the portable terminal 10 may recognize more than two electronic appliances 100. This process will be explained as another embodiment hereinafter.

Figures 19, 20:
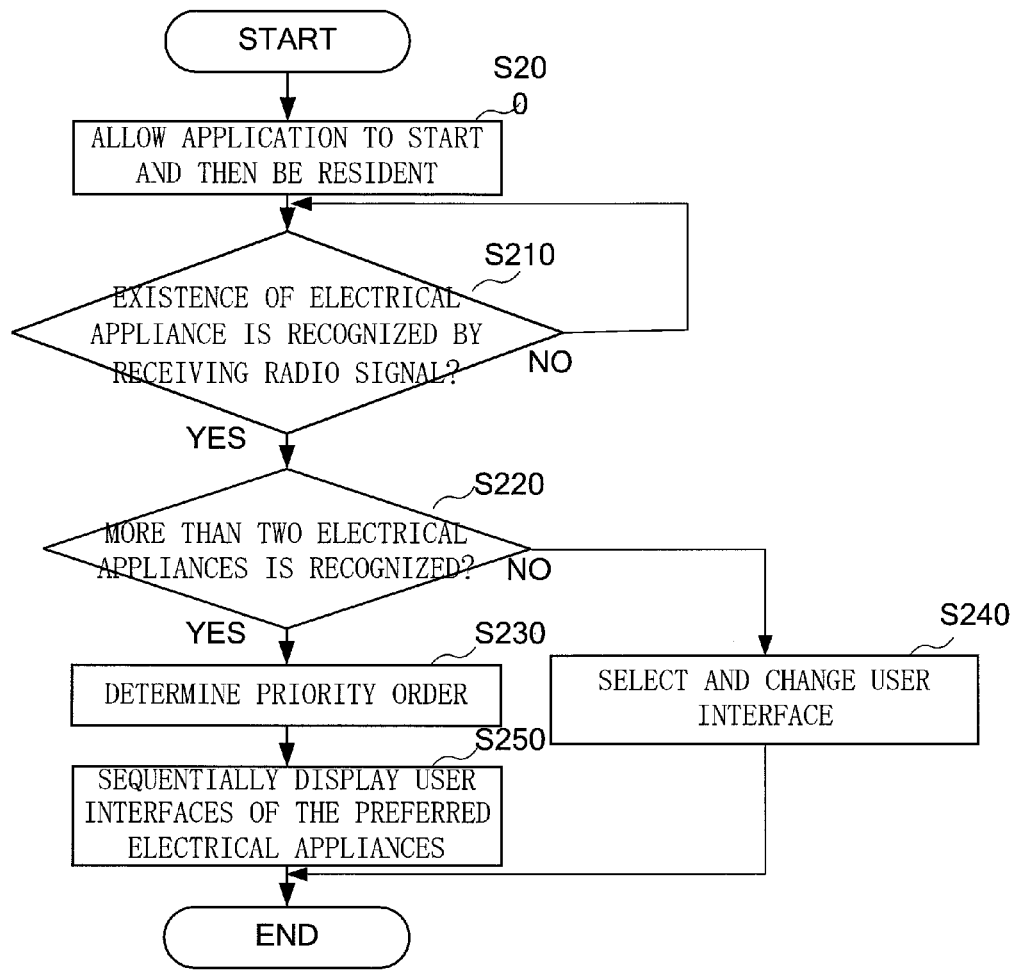
FIG. 19 illustrates the third basic process flow performed by the portable terminal 10.
FIG. 20 illustrates a UI correspondence table 8 that is stored in the portable terminal 10 and corresponds to a priority order.

FIG. 19 is the flow chart of the third basic process performed by the portable terminal 10. First, the application controller 12 of the portable terminal 10 allows an application varying by electronic appliance 100 to start and then be resident in a memory of the portable terminal 10 (Step S200).

Then, a recognizer 11 determines whether or not it has recognized an electronic appliance 100 by receiving a radio signal (Step S210). In other words, the recognizer 11 determines whether or not a GPS radio signal that is location information has been received, or whether or not a radio signal of an SSID that is an access point has been received. If the recognizer determines that a radio signal has been received, the process proceeds to the step S220 (Step S210: "YES"). If not (Step S210: "NO"), the step 210 is repeated.

When the recognizer 11 determines that a GPS radio signal has been received, the recognizer 11 calculates the latitude and the longitude of the portable terminal 10 based on the received radio signal. Next, the recognizer 11 refers the UI correspondence table 5 that is shown in FIG. 16 and associated with the model name of an electronic appliance, location information (longitude and latitude), and the name of a user interface. This UI correspondence table 5 is stored in the portable terminal 10. The recognizer 11 selects a user interface by referring the UI correspondence table 5 based on the calculated latitude and longitude.

When the recognizer 11 determines that an radio signal of an SSID that is an access point has been received, the recognizer 11 refers the UI correspondence table 6 that is shown in FIG. 17 and associated with the model name of an electronic appliance, an SSID, and the name of a user interface. This UI correspondence table 6 is stored in the portable terminal 10. The recognizer 11 selects a user interface by referring the UI correspondence table 6 based on the SSID.

The recognizer 11 may recognize an electronic appliance 100 based on a photographic image in the similar way to the second basic process in addition to the above-mentioned process.

In this case, if the recognizer 11 determines that a single electronic appliance has been recognized (Step S220: "NO"), the interface changer 13 changes the user interface of the portable terminal into a user interface selected by the recognizer 11 (Step S240).

For example, the recognizer 11 may recognize a plurality of electronic appliances 100 from a GPS and a radio signal of SSID respectively. In this case, the step S220 returns "YES" and then moves the process to the step S230.

When the recognizer 11 determines that more than two electronic appliances have been recognized (Step S220: "YES"), the recognizer 11 determines a priority order in which the portable terminal should preferentially display which among more than two user interfaces (Step S230). In other words, when the recognizer 11 determines that a popularity of electronic appliances have been recognized, the recognizer 11 refers the UI correspondence table 8 that is shown in FIG. 20 and associated with a priority order, the model name of an electronic appliance, and the name of a user interface. This table is stored in a portable terminal 10. The recognizer 11 determines the model name of an electronic appliance from a received radio signal (from a GPS or of an SSID) and a photographic image based on each table as shown in FIGS. 10-13 and 16-18. Then, based on this electronic appliance model name, the recognizer 11 determines a priority order by referring the UI correspondence table 8 as shown in FIG. 20.

For example, when the recognizer recognizes a plurality of electronic appliances 100 of "TV-100", "RZ-001", and "MP500" at about the same time, the recognizer determines that the priority order is "RZ-001", "TV-100", and "MP500" in that order, based on the priority order of the UI correspondence table 8.

Next, the interface changer 13 of the portable terminal 10 sequentially displays user interfaces of the preferred electronic appliances 100 (Step S150). User interfaces are displayed sequentially, which means herein that they are displayed in the determined priority order. As described hereinafter, when a predetermined condition is met in the portable terminal 10, the order is changed to the next user interface.

For example, when a predetermined operation is conducted for the first user interface displayed in the portable terminal 10, the user interface of the portable terminal is changed into the second user interface. In this case, the user input items (indicating selection of a predetermined icon and key input) for the first user interface is preliminarily stored. When all of these input items are input, the user interface of the portable terminal is changed into the second user interface.

Alternatively, when a predetermined display is conducted for the first user interface displayed in the portable terminal 10, the user interface of the portable terminal is changed into the second user interface. In this case, the display items (indicating display of a predetermined icon and toggle switch for windows) for the first user interface is preliminarily stored. When all of this display items are displayed, the user interface of the portable terminal is changed into the second user interface.

Alternatively, the user interface of the portable terminal is changed into the second user interface a predetermined time after the first user interface is displayed in the portable terminal 10.

Figure 21:
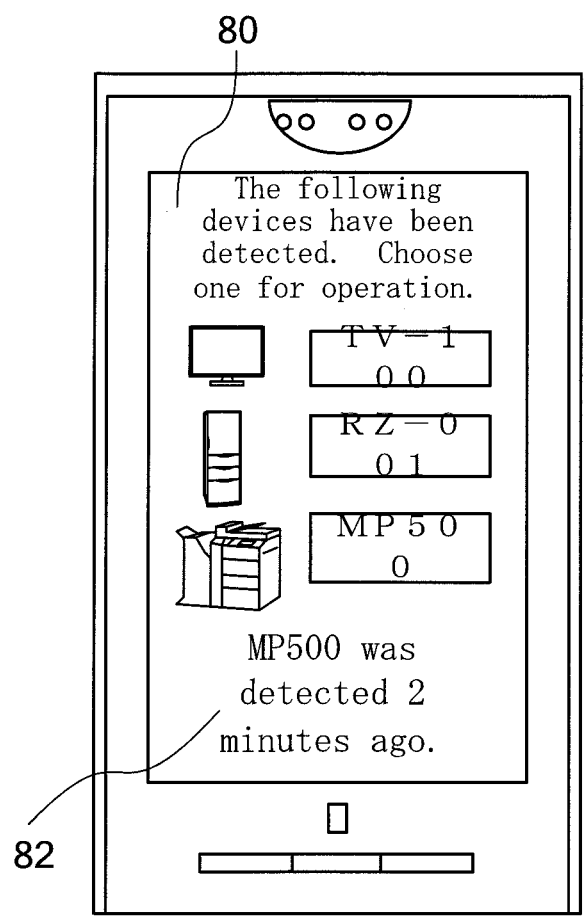
FIG. 21 illustrates examples of user interfaces displayed on the portable terminal 10.

The priority order of the UI correspondence table 8 as shown in FIG. 20 may be determined by the learning function from the input history of a user who operates the portable terminal 10. In other words, when a plurality of electronic appliances 100 are recognized, the portable terminal 10 displays a screen image 80 as shown in FIG. 21. If a user selects the electronic appliance "TV-100" and the next electronic appliance "MP500" among a plurality of electronic appliances 100, the portable terminal 10 learns that the priority order is "TV-100" and "MP500" in that order.

This priority order is not limited to a time priority order as described above, but the priority order may be applied to a location located on the screen image 80 as shown in FIG. 21. In other words, the user interfaces may be displayed on the display unit from top down in descending priority order.

The UI correspondence table 8 as shown in FIG. 20 may be stored in a server communicatably connected with a portable terminal 10. In this case, the portable terminal 10 determines the priority order by inquiring of the server about the priority order in the UI correspondence table 8.

As shown in the UI correspondence table 7 of FIG. 18, when the portable terminal recognizes a plurality of user interfaces, the portable terminal may select a user interface to be preferentially displayed and may change its user interface into this selected user interface, based on a date and time (the day of a week, a date, and a time) at the time of recognition. For example, in the example of FIG. 18, in the case in which a plurality of electronic appliances 100 are recognized at around 7:00 in the afternoon on Saturday, the user interface "RZ-001" have a priority based on the table. Not only the day of a week but also a date may be specified.

The portable terminal may select a user interface to be preferentially displayed and may change its user interface into this selected user interface, based on the temperature and humidity at the time of recognition. This is preferable when the electronic appliance 100 is an air conditioner or the like.

FIG. 21 shows a screen image 80 displayed on the portable terminal 10 when the portable terminal 10 recognizes a plurality of electronic appliances 100. A selection screen is displayed to select any of the user interfaces of such a plurality of electronic appliances 100. At this point, recommendation information for user interface to be displayed such as a message 82 may be additionally displayed.

The user interface may be changed based on a person, a human face, the number of persons, an animal, the number of animals, a plant, the number of plants, and the predetermined object that are taken in a photographic image. For example, when the portable terminal changes its user interface into the user interface of a digital camera after the portable terminal recognizes a photographed person (for example, a user's face), the person (the user) can be taken in a picture remotely.

To achieve the means and functions as described above, a computer (including a CPU, an information processor, and various terminals) reads and executes a predetermined program. For example, an application program is provided in forms recorded in a computer-readable record medium such as a flexible disk, a CD (CD-ROM etc.), and a DVD (a DVD-ROM and a DVD-RAM, etc.). In this case, a computer reads an application program from a record medium, forwards the application program to internal or external storage to store the application program therein, and executes the application program. For example, the application program may be preliminarily recorded in memory (a record media) such as a magnetic disk, an optical disk, and a magnetic optical disk, and then provided from memory to a computer through a communication line.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

REFERENCE SIGNS LIST

10 Portable Terminal
100 Electronic Appliance

The invention claimed is:

1. A portable terminal comprising:
a recognizer recognizing a circumferentially existing electronic appliance based on a photographic image or a radio signal;
an application controller allowing one or more applications related to the electronic appliance to start and then be resident in a memory, the application having a user interface varying by electronic appliance,
an interface changer, when the recognizer recognizes a predetermined electronic appliance, changing a user interface displayed on a display unit and an input unit of the portable terminal into a user interface of an application associated with the recognized predetermined electronic appliance, among the applications being resident in the memory, so as to enable a user to view the user interface using the portable terminal;
a memory storing the physical location of the electronic appliance as location information;
a first detector detecting the direction to which an upper face of the portable terminal points;
a positioning determinator determining the physical location of the portable terminal, and
a object determinator determining an electronic appliance existing in a path being an extension of the direction of the upper face of the portable terminal, among electronic appliances, the location information of which is stored,
wherein, when recognizing two or more electronic appliances, the portable terminal is constructed and arranged to access a table that identifies priority orders of different electronic appliances, including the two or more recognized electronic appliances, and to change the user interface of the portable terminal to the user interface of an application associated with the electronic appliance of the two or more electronic appliances identified in the table that has the highest priority,
wherein the portable terminal is further constructed and arranged to operate a learning function to generate priority orders of electronic appliances listed in the table based on a history of selections of electronic appliances made by the user of the portable terminal, and
wherein, when constructed and arranged to operate the learning function, the portable terminal is further constructed and arranged to:
display on the portable terminal a list of the two or more electronic appliances;
receive from the user of the portable terminal a manual selection of one of the displayed electronic appliances, the manual selection thus forming one of the history of selections of electronic appliances made by the user of the portable terminal; and
assign the selected one of the displayed electronic appliances a higher priority than another of the displayed electronic appliances that was not selected.

2. The portable terminal according to claim 1, wherein the recognizer recognizes the electronic appliance by receiving at least one of a GPS radio signal, an SSID radio signal, and a short distance radio signal.

3. The portable terminal according to claim 1, wherein the first detector detects the direction to which the upper face of the portable terminal points from the difference in location information contents, each of which is detected by two or more location detectors respectively.

4. The portable terminal according to claim 1, wherein the first detector detects the direction to which the upper face of the portable terminal points by at least one of an electronic compass and an inclination sensor.

5. The portable terminal according to claim 1, further comprises a second detector detecting SSID or an access point by receiving a radio signal, wherein only when the second detector detects a predetermined SSID, the recognizer performs a process recognizing an electronic appliance based on a short distance radio signal output from the predetermined electronic appliance.

6. The portable terminal according to claim 1, wherein the recognizer recognizes the electronic appliance based on a photographic image obtained by taking an image of the electronic appliance with a camera provided on the upper face of the portable terminal.

7. The portable terminal according to claim 6, wherein the recognizer recognizes a photographic image obtained by taking an image of a two-dimensional code attached to the electronic appliance when the recognizer recognizes the electronic appliance with a camera of the portable terminal.

8. The portable terminal according to claim 1, wherein the recognizer transmits an SSID detected by the second detector to a communicatably connected server and receives data associated with the SSID so as to perform recognition of the electronic appliance, and the data is for recognizing an electronic appliance based on a photographic image or a radio signal.

9. The portable terminal according to claim 1, wherein when the recognizer recognizes two or more electronic appliances, the interface changer changes the user interface of the portable terminal to the user interface of an application associated with one of the predetermined electronic appliances based on a date of recognition.

10. The portable terminal according to claim 1, wherein when the recognizer recognizes two or more electronic appliances and accesses a table that identifies priority orders of different electronic appliances, including the two or more electronic appliances recognized by the recognizer, the interface changer changes the user interface of the portable terminal to the user interface of an application associated with the electronic appliance of the two or more electronic appliances identified in the table that has the highest priority.

11. A computer program product for use in a portable terminal, comprising:
a non-transitory computer usable medium having a set of instructions physically embodied therein; the set of instructions including:
computer readable program code causing a recognizer to recognize a circumferentially existing electronic appliance based on a photographic image or a radio signal;
computer readable program code causing an application controller to allow one or more applications related to electronic appliances to start and then be resident in a memory, the application having a user interface varying by electronic appliance;
computer readable program code causing, when the portable terminal recognizes a predetermined electronic appliance, the portable terminal to change a user interface displayed on a display unit and an input unit of the portable terminal into a user interface of an application associated with the predetermined electronic appliance, recognized among the applications being resident in the memory, so as to enable a user to view the user interface using the portable terminal;

computer readable program code causing a memory to store the physical location of the electronic appliance as location information;

computer readable program code causing a first detector to detect the direction to which an upper face of the portable terminal points;

computer readable program code causing a positioning determinator to determine the physical location of the portable terminal, and computer readable program code causing an object determinator to determine an electronic appliance existing in a path being an extension of the direction of the upper face of the portable terminal, among electronic appliances, the location information of which is stored, wherein the computer readable program code causing the portable terminal to change includes computer-readable code to change the user interface of the portable terminal into a user interface of an application associated with the electronic appliance determined by the object determinator, and wherein, when recognizing two or more electronic appliances, the method further comprises accessing a table that identifies priority orders of different electronic appliances, including the two or more recognized electronic appliances, and changing the user interface of the portable terminal to the user interface of an application associated with the electronic appliance of the two or more electronic appliances identified in the table that has the highest priority, wherein the method further comprises operating a learning function to generate priority orders of electronic appliances listed in the table based on a history of selections of electronic appliances made by the user of the portable terminal, wherein operating the learning function includes:
  displaying on the portable terminal a list of the two or more electronic appliances;
  receiving from the user of the portable terminal a manual selection of one of the displayed electronic appliances, the manual selection thus forming one of the history of selections of electronic appliances made by the user of the portable terminal; and
  assigning the selected one of the displayed electronic appliances a higher priority than another of the displayed electronic appliances that was not selected.

12. A method comprising the steps of:

recognizing a circumferentially existing electronic appliance based on a photographic image or a radio signal;

allowing one or more applications related to the electronic appliance to start and then be resident in a memory, the application having a user interface varying by electronic appliance;

changing a user interface displayed on a display unit and an input unit of the portable terminal, when the portable terminal recognizes a predetermined electronic appliance, into a user interface of an application associated with the predetermined electronic appliance recognized, among the applications being resident in the memory, so as to enable a user to view the user interface using the portable terminal:

storing the physical location of the electronic appliance as location information;

detector detecting the direction to which an upper face of the portable terminal points;

determining the physical location of the portable terminal, and determining an electronic appliance existing in a path being an extension of the direction of the upper face of the portable terminal, among electronic appliances, the location information of which is stored, wherein changing the user interface displayed on the display unit into the user interface of the application associated with the electronic appliance is performed in response to the act of determining the electronic appliance existing in the path, and wherein determining an electronic appliance existing in a path being an extension of the direction of the upper face of the portable terminal, among electronic appliances, includes:
  computing a three-dimensional line that passes through the physical location of the portable terminal;
  rendering the location information of the electronic appliance in the form of a three-dimensional solid having a size the fits the electronic appliance;
  testing whether the three-dimensional line intersects the three-dimensional solid; and
  determining that the electronic appliance exists in the path being an extension of the direction of the upper face of the portable terminal based on the testing indicating that the three-dimensional line intersects the three-dimensional solid, wherein, when recognizing two or more electronic appliances, the method further comprises accessing a table that identifies priority orders of different electronic appliances, including the two or more recognized electronic appliances, and changing the user interface of the portable terminal to the user interface of an application associated with the electronic appliance of the two or more electronic appliances identified in the table that has the highest priority, further comprising operating a learning function to generate priority orders of electronic appliances listed in the table based on a history of selections of electronic appliances made by the user of the portable terminal, wherein operating the learning function includes:

displaying on the portable terminal a list of the two or more electronic appliances;

receiving from the user of the portable terminal a manual selection of one of the displayed electronic appliances, the manual selection thus forming one of the history of selections of electronic appliances made by the user of the portable terminal; and assigning the selected one of the displayed electronic appliances a higher priority than another of the displayed electronic appliances that was not selected.

13. The method of claim 12, further comprising, prior to recognizing the circumferentially existing electronic appliance:

detecting an SSID from a radio in a geographic vicinity of the electronic appliance; and comparing the detected SSID with a predetermined SSID, wherein recognizing the circumferentially existing electronic appliance is performed in response to the act of comparing indicating that the detected SSID from the radio matches the predetermined SSID, and wherein comparing the detected SSID with the predetermined SSID from the radio provides security authentication to prevent the portable terminal from operating the electronic appliance unless the portable terminal detects the predetermined SSID.

14. The method of claim 13, further comprising, in response to detecting the predetermined SSID from the radio:
  reading an electronic appliance list that associates the detected SSID with multiple electronic appliances connectable with a LAN having the detected SSID,
  wherein determining the electronic appliance existing in the path includes identifying an electronic appliance from the electronic appliance list that has a location that intersects the path being an extension of the direction of the upper face of the portable terminal.

15. The method of claim 12, wherein the predetermined electronic appliance includes an air conditioner, and wherein changing the user interface of the portable terminal to the user interface of the application associated with the predetermined electronic appliance is based on temperature and humidity at a time of recognition.

16. The method of claim 12, wherein recognizing the circumferentially existing electronic appliance includes a camera disposed at the upper face of the portable terminal taking an image of the circumferentially existing electronic appliance along a line of sight that extends perpendicular to a viewing axis of a display of the portable terminal.

17. The method of claim 16, wherein recognizing the circumferentially existing electronic appliance includes taking an image of a two-dimensional code attached to the circumferentially existing electronic appliance.

18. The method according to claim 12, further comprising transmitting an SSID detected by the portable terminal to a communicatably connected server and receiving data associated with the SSID so as to perform recognition of the electronic appliance.

* * * * *